US011677670B2

(12) United States Patent
Liu et al.

(10) Patent No.: US 11,677,670 B2
(45) Date of Patent: Jun. 13, 2023

(54) METHOD FOR DETERMINING SENDING PERIOD IN DETERMINISTIC NETWORK AND APPARATUS

(71) Applicant: HUAWEI TECHNOLOGIES CO., LTD., Guangdong (CN)

(72) Inventors: Yang Liu, Beijing (CN); Yanjun Liu, Beijing (CN); Zongxin Dou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/680,535

(22) Filed: Feb. 25, 2022

(65) Prior Publication Data

US 2022/0182330 A1 Jun. 9, 2022

Related U.S. Application Data

(63) Continuation of application No. PCT/CN2020/110390, filed on Aug. 21, 2020.

(30) Foreign Application Priority Data

Aug. 30, 2019 (CN) .......................... 201910814393.2

(51) Int. Cl.
*H04L 47/28* (2022.01)
*H04J 3/06* (2006.01)
*H04J 3/16* (2006.01)

(52) U.S. Cl.
CPC ............ *H04L 47/28* (2013.01); *H04J 3/0661* (2013.01); *H04J 3/1605* (2013.01)

(58) Field of Classification Search
CPC ....... H04L 47/28; H04L 47/283; H04L 47/31; H04L 69/06; H04J 3/0661; H04J 3/1605
See application file for complete search history.

(56) References Cited

U.S. PATENT DOCUMENTS 8,644,352 B1 * 2/2014 Hutchison ............. H04L 47/283
709/248
8,937,974 B1 * 1/2015 Pannell ................... H04L 43/04
709/224

(Continued)

FOREIGN PATENT DOCUMENTS

CN 104092697 A 10/2014
CN 105281969 A 1/2016

(Continued)

OTHER PUBLICATIONS

Qiang L et al: "Large-Scale Deterministic IP Network; draft-qiang-detnetlarge-scale-detnet-04. txt", Large-Scale Deterministic IP Network; draft-qiangdetnet-large-scale-detnet-04.txt; Internet-Draft Network Working Group, Internet Engineering Taskforce, IETF; Standardworkingdraft, Internet Society No. 4, Mar. 11, 2019 (Mar. 11, 2019), pp. 1-15, XP015131935,Retrieved from the Internet:URL:https :/ /tools. ietf.org/htm l/draft-qiang-detnet-large-scale-detnet-04[retrieved on Mar. 11, 2019.

(Continued)

*Primary Examiner* — Hoang-Chuong Q Vu

(57) ABSTRACT

A method for determining a sending period of a packet in a deterministic network and an apparatus are disclosed. The method includes: receiving a first packet; determining a first period, where the first period is a sending period of the first packet; determining timestamp information of the first packet based on the first period, where the timestamp information is used to indicate a time difference between a first time and a second time, the first time is a time at which the first packet starts to be sent in the first period, and the second time is a start time of the first period; encapsulating the timestamp information into the first packet to obtain a second packet; and sending the second packet.

14 Claims, 4 Drawing Sheets

(56) References Cited

U.S. PATENT DOCUMENTS

| | | | |
|---|---|---|---|
| 9,019,996 B2* | 4/2015 | Fourcand | H04J 3/0682 370/503 |
| 2007/0100473 A1 | 5/2007 | Shvodian et al. | |
| 2011/0164544 A1* | 7/2011 | Al | H04W 72/569 370/312 |
| 2011/0216756 A1* | 9/2011 | Ai | H04L 67/62 370/350 |
| 2011/0216787 A1* | 9/2011 | Ai | H04W 72/30 370/503 |
| 2012/0099511 A1* | 4/2012 | Wang | H04L 43/10 370/312 |
| 2012/0243458 A1* | 9/2012 | Ai | H04W 72/30 370/312 |
| 2014/0334553 A1* | 11/2014 | Novotny | H04N 19/177 375/240.26 |
| 2016/0182215 A1 | 6/2016 | Valenza et al. | |
| 2016/0197705 A1* | 7/2016 | Ryu | H04L 1/1854 370/242 |
| 2017/0041688 A1* | 2/2017 | Pitigoi-Aron | G06F 1/08 |
| 2017/0188058 A1* | 6/2017 | Nakashima | H04N 21/2387 |
| 2020/0107263 A1* | 4/2020 | Boger | H04W 52/0216 |
| 2020/0137530 A1* | 4/2020 | Xu | H04W 4/06 |

FOREIGN PATENT DOCUMENTS

| | | |
|---|---|---|
| CN | 108781162 A | 11/2018 |
| EP | 2106052 A2 | 9/2009 |
| WO | 2014032348 A1 | 3/2014 |
| WO | 2016045516 A1 | 3/2016 |
| WO | 2018094616 A1 | 5/2018 |
| WO | 2019157978 A1 | 8/2019 |

OTHER PUBLICATIONS

Extended European Search Report issued in EP20858250.2, dated Aug. 11, 2022, 11 pages.
Huang Tao et al., Survey of the deterministic network, 2019, 17 pages.
PCT Search Report for PCT/CN2020/110390 dated Aug. 21, 2020, 9 pages.

* cited by examiner

METHOD FOR DETERMINING SENDING PERIOD IN DETERMINISTIC NETWORK AND APPARATUS

CROSS-REFERENCE TO RELATED APPLICATIONS

This application is a continuation of International Application No. PCT/CN2020/110390, filed on Aug. 21, 2020, which claims priority to Chinese Patent Application No. 201910814393.2, filed on Aug. 30, 2019. The disclosures of the aforementioned applications are hereby incorporated by reference in their entireties.

TECHNICAL FIELD

This application relates to communications technologies, and in particular, to a method for determining a sending period in a deterministic network and an apparatus.

BACKGROUND

A purpose of a deterministic network (deterministic IP, DIP) technology is to provide deterministic latency and jitter guarantee based on an existing internet protocol (IP) forwarding mechanism. A technical core of the DIP technology is a periodic scheduling mechanism. A stable period mapping relationship is maintained between any two adjacent nodes on a data link in a deterministic network. The period mapping relationship indicates a mapping relationship between a period number of a packet sent from an upstream node and a period number of the packet sent again from a downstream node. The downstream node receives a packet at an ingress port, queries, based on the period mapping relationship, a fixed period corresponding to a period tag carried in the packet, and sends the packet in the fixed period at an egress port of the downstream node. In addition, the packet occupies only a reserved resource of the downstream node in the fixed period. This can ensure that each packet has a definite scheduling period.

In the related technologies, a downstream node may obtain a period mapping relationship by learning, that is, the downstream node first determines a $1^{st}$ packet (the $1^{st}$ packet carries a period tag and the period tag includes a period number T) sent at an egress port of an upstream node in the period numbered T, and determines a time when the $1^{st}$ packet arrives at an ingress port of the downstream node. The downstream node deduces, based on parameters such as the period numbered T and jitter of the node, a latest time when a tail packet (the tail packet also carries a period tag and the period tag includes the period number T) sent at the egress port of the upstream node in the period numbered T may arrive at the ingress port of the downstream node. Based on the foregoing information, the downstream node may obtain a period mapping relationship between the egress port of the upstream node and the egress port of the downstream node: A (for example, the period number T)→B (for example, a number of a first period after (a time when the $1^{st}$ packet arrives at the ingress port of the downstream node+period number T+jitter range)).

However, when a plurality of packets at the egress port of the upstream node in a period are respectively sent to a plurality of egress ports of the downstream node, only one of the plurality of packets is the $1^{st}$ packet. According to the foregoing method, in the downstream node, only the egress port that receives the $1^{st}$ packet can obtain the foregoing period mapping relationship A→B, and a period mapping relationship obtained by the egress port that receives a non-$1^{st}$ packet is incorrect. Consequently, the egress port fails to schedule a packet based on a period.

SUMMARY

This application provides a method for determining a sending period in a deterministic network and an apparatus, so that a downstream node determines a sending period of a packet.

According to a first aspect, an embodiment of this application provides a method for determining a sending period of a packet in a deterministic network, including:

receiving a first packet; determining a first period, where the first period is a sending period of the first packet; determining timestamp information of the first packet based on the first period, where the timestamp information is used to indicate a time difference between a first time and a second time, the first time is a start sending time of the first packet in the first period, and the second time is a start time of the first period; encapsulating the timestamp information into the first packet to obtain a second packet; and sending the second packet.

In this embodiment, a packet sent by an upstream node to a downstream node carries timestamp information. The timestamp information is used to indicate a time difference between a start sending time of the packet in a sending period and a start time of the sending period at the upstream node, so as to notify the downstream node of an actual sending time of the packet, thereby implementing decoupling between a $1^{st}$ packet and a non-$1^{st}$ packet among packets, and helping the downstream node determine a sending period of the packets.

In a possible implementation, the determining timestamp information of the first packet based on the first period includes: obtaining a total sending duration of all packets sent before the first packet in the first period; determining the first time based on the second time and the total sending duration; and determining the timestamp information based on the first time and the second time.

In a possible implementation, the timestamp information includes the time difference between the first time and the second time.

According to a second aspect, an embodiment of this application provides a method for obtaining a period mapping relationship in a deterministic network, including:

receiving a second packet sent by an upstream node in a first period, where the second packet includes timestamp information, the timestamp information is used to indicate a time difference between a first time and a second time, the first time is a start sending time of the second packet in the first period, and the second time is a start time of the first period; determining a corrected arrival time of the second packet based on the timestamp information; and determining a second period based on the corrected arrival time, where the second period is a sending period of the second packet.

In this embodiment, a downstream node obtains, through calculation based on timestamp information carried in a received packet, a corrected arrival time of the packet. The corrected arrival time is equivalent to a time when the packet sent at a start time of a sending period at the upstream node arrives at the downstream node. Based on the corrected arrival time, the network node can accurately obtain the sending period of the packet, thereby avoiding a problem of failure in periodic scheduling of a non-$1^{st}$ packet.

In a possible implementation, the timestamp information includes the time difference between the first time and the second time.

In a possible implementation, the determining a corrected arrival time of the first packet based on the timestamp information includes: calculating a difference between an actual arrival time of the first packet and the time difference; and using the difference as the corrected arrival time.

In a possible implementation, the second packet further includes a first period tag and the first period tag is used to indicate the first period; the method further includes: comparing the first period tag with a second period tag carried in a third packet, where the third packet is sent by the upstream node and received before the second packet; and if the first period tag is different from the second period tag, determining that the second packet is a $1^{st}$ packet sent by the upstream node in the first period; or if the first period tag is the same as the second period tag, determining that the second packet is a non-$1^{st}$ packet sent by the upstream node in the first period.

According to a third aspect, an embodiment of this application provides an apparatus. The apparatus has a function of implementing the method according to any one of the first aspect or the second aspect. The function may be implemented by hardware, or may be implemented by hardware executing corresponding software. The hardware or software includes one or more modules corresponding to the foregoing function.

According to a fourth aspect, an embodiment of this application provides a network apparatus, including:

one or more processors;

a memory, configured to store one or more programs, wherein when the one or more programs are executed by the one or more processors, the one or more processors are enabled to implement the method according to any one of the first aspect and the second aspect.

Optionally, the network apparatus may be a network node, or may alternatively be a chip.

According to a fifth aspect, an embodiment of this application provides a computer-readable storage medium that includes instructions, where when the instructions are executed on a computer, the computer is enabled to perform the method according to any one of the first aspect or the second aspect.

According to a sixth aspect, an embodiment of this application provides a computer program product that includes instructions, where when the computer program product runs on a computer, the computer is enabled to perform the method according to any one of the first aspect or the second aspect.

DESCRIPTION OF EMBODIMENTS

The following clearly and completely describes technical solutions in this application with reference to the accompanying drawings in this application.

In the embodiments, claims, and the accompanying drawings of the specification in this application, terms such as "first" and "second" are merely used for distinction and description, and should not be understood as an indication or implication of relative importance, or as an indication or implication of an order. In addition, terms "including" and "having" and any variants thereof are intended to cover non-exclusive inclusion, for example, include a series of steps or units. A method, system, product, or device is not necessarily limited to those steps or units that are expressly listed, but may include other steps or units that are not expressly listed or inherent to such a process, method, product, or device.

It should be understood that, in this application, "at least one" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items, including a single item (piece) or any combination of a plurality of items (pieces). For example, at least one (piece) of a, b, or c may represent a, b, c, "a and b", "a and c", "b and c", or "a, b, and c", where a, b, and c may be singular or plural.

Figure 1:
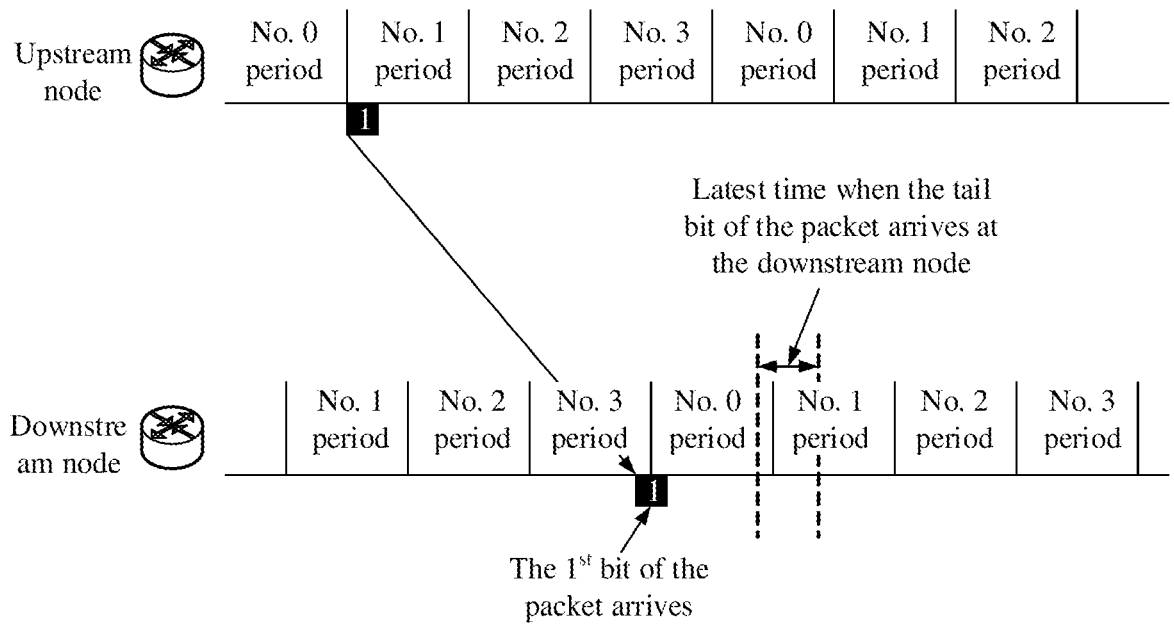
FIG. 1 is a schematic diagram of a period mapping relationship between any two adjacent nodes on a data forwarding path in a DIP.

As shown in FIG. 1, a stable period mapping relationship is maintained between any two adjacent nodes on a data forwarding path in a DIP. The period mapping relationship indicates a mapping relationship between a period serial number of a packet sent from an upstream node and a period serial number of the packet sent again from a downstream node. Each node periodically and cyclically numbers a time axis of the node, and a number range may be, for example, 0-3. The upstream node starts to send a packet in a period numbered x (for example, x=1), and after transmission through a data forwarding path, a time when a $1^{st}$ bit of the packet arrives at the downstream node is a period numbered y (for example, y=3) of the downstream node. A latest time when a tail bit of the packet arrives at the downstream node is a period numbered y+2 (for example, the number is 1) of the downstream node. Therefore, a time when the downstream node sends the packet again is a next period, that is, a period numbered y+3 (for example, the number is 2) after all packets are received. In this way, a period mapping relationship x→y+3 is established between the upstream node and the downstream node. Based on the period mapping relationship, the upstream node only needs to add the number of the sending period of the upstream node to the packet. The downstream node parses the period number carried in the packet and determines a number of a local sending period of the packet based on the period number and the period mapping relationship. In this way, the DIP can implement periodic scheduling.

Figure 2:
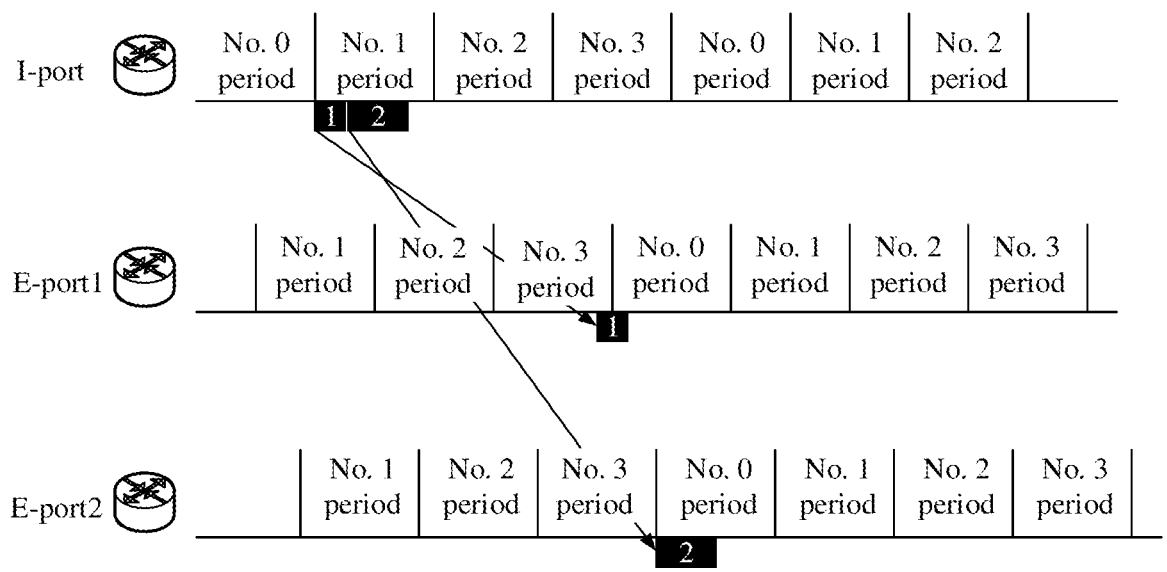
FIG. 2 is a schematic diagram of packet forwarding on a data forwarding path in a DIP.

As shown in FIG. 2, a plurality of packets at an egress port of the upstream node in a period are respectively sent to a plurality of egress ports of the downstream node. For example, in a period numbered 1, an egress port (I-port) of the upstream node sends two packets 1 and 2 successively. The two packets 1 and 2 enter the downstream node through an ingress port of the downstream node, where the packet 1 is sent through a first egress port (E-port1) of the downstream node and the packet 2 is sent through a second egress port (E-port2) of the downstream node. However, because only one of the plurality of packets sent by the upstream node in a period is a $1^{st}$ packet (that is, the packet 1) and in the downstream node, only the egress port (E-port1) that receives the $1^{st}$ packet can accurately obtain the foregoing period mapping relationship x→y+3 based on a period in which an actual receiving time of the packet 1 is located. However, if the egress port (E-port2) that receives a non-$1^{st}$ packet (that is, the packet 2) determines a sending period based on a period in which an actual receiving time of the packet 2 is located, an obtained result may probably be incorrect. For a plurality of packets sent by the upstream node to a same downstream node in a same period, the downstream node needs to send the plurality of packets in a same period. For example, if the E-port1 receives the packet 1 in a period numbered 3, it may be determined that the number of the sending period of the packet 1 is 2, and if the E-port2 receives the packet 2 in a period numbered 0, the determined number of the sending period of the packet 2 is 3. However, the sending period (numbered 3) determined by the E-port2 is incorrect. Consequently, the egress port (E-port2) fails to schedule a packet based on a period. This application provides a method for determining a sending period in a DIP, to resolve the foregoing problem. The following describes the technical solutions in this application.

Figure 3:
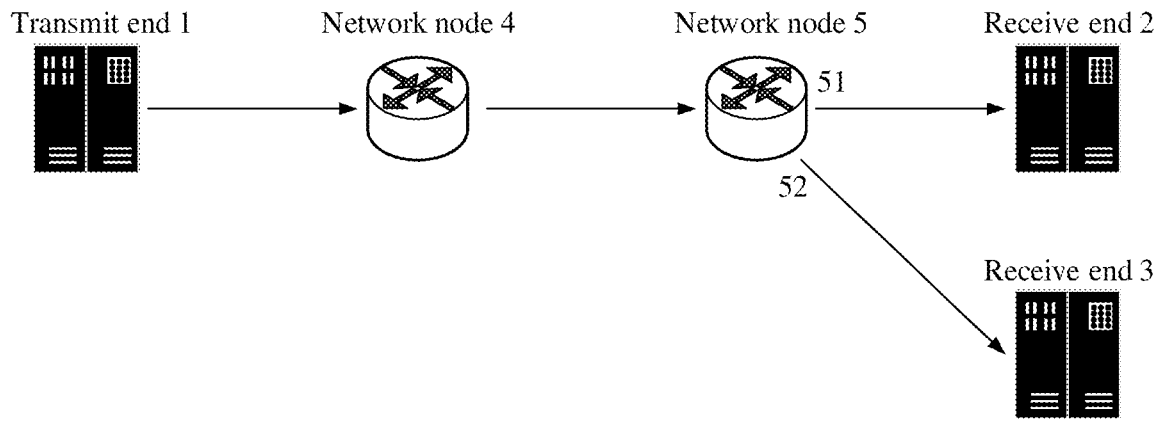
FIG. 3 is an example diagram of an application scenario of a method for determining a sending period in a DIP according to an embodiment of this application.

FIG. 3 is an example diagram of an application scenario of a method for determining a sending period in a DIP according to an embodiment of this application. As shown in FIG. 3, the application scenario includes a transmit end 1 and receive ends 2 and 3 of a packet. At least two network nodes, such as network nodes 4 and 5, are included between the transmit end 1 and the receive ends 2 and 3, and the network nodes 4 and 5 are configured to forward packets. The transmit end 1 sends two packets, and an ingress port of the network node 4 receives the two packets. The two packets are sent by an egress port of the network node 4 to an ingress port of the network node 5 in a same period. One of the two packets is sent by an egress port 51 of the network node 5 to the receive end 2, and the other one of the two packets is sent by an egress port 52 of the network node 5 to the receive end 3.

It should be noted that, in embodiments of this application, the plurality of egress ports (for example, the egress ports 51 and 52) of the downstream node (for example, the network node 5) may be different ports on a same board, or may alternatively be ports on different boards. This is not specifically limited.

Figure 4:
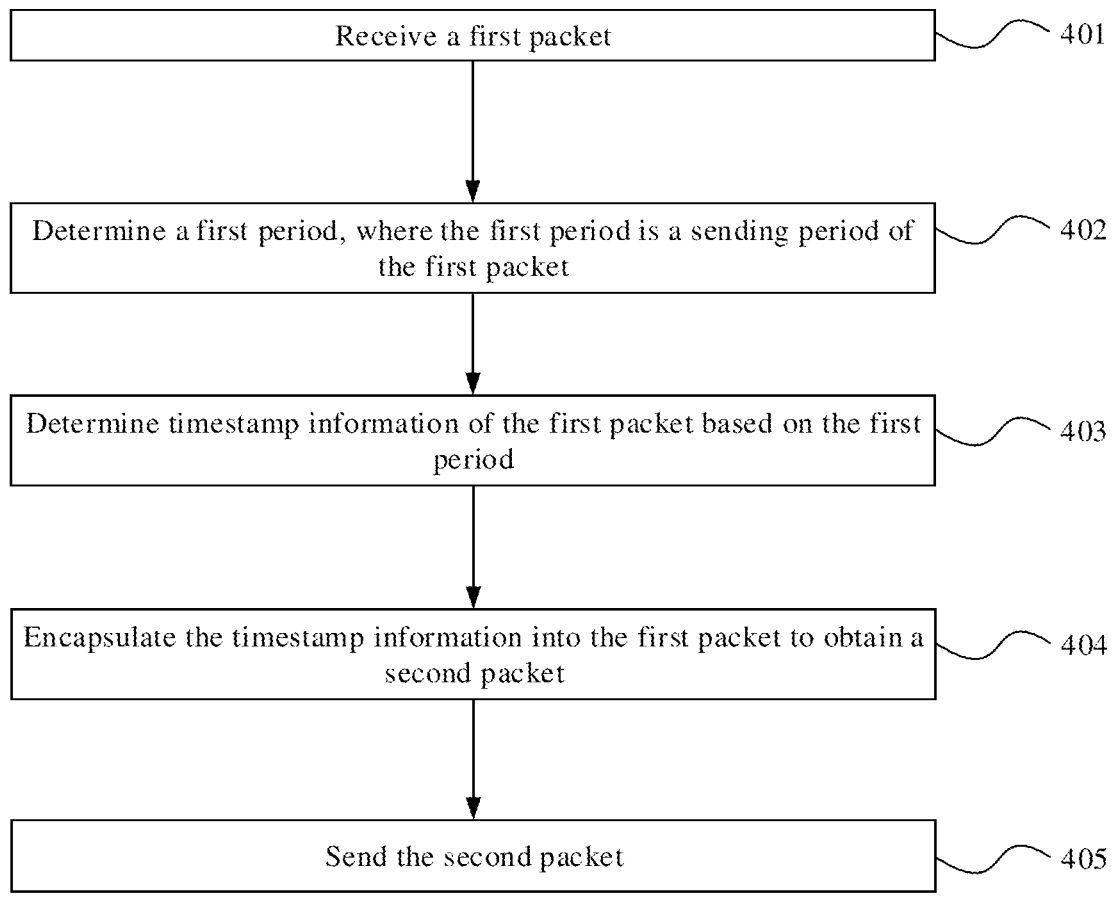
FIG. 4 is a flowchart of Embodiment 1 of a method for determining a sending period in a DIP according to an embodiment of this application.

FIG. 4 is a flowchart of Embodiment 1 of a method for determining a sending period in a DIP according to an embodiment of this application. As shown in FIG. 4, the method in this embodiment may be performed by the network node 4 that is used as an upstream node in the application scenario shown in FIG. 3. The method for determining a sending period in a DIP includes the following steps.

401. Receive a first packet.

The network node may receive the first packet from another network node or a transmit end of the packet.

402. Determine a first period, where the first period is a sending period of the first packet.

In the DIP, each of the network nodes determines a sending period of the first packet on the node based on a sending period of the first packet on an upstream node. Generally, the first packet carries a period tag, where the period tag is used to indicate the sending period of the first packet on the upstream node, for example, a number of the sending period. The network node may determine the sending period of the first packet based on the period tag.

403. Determine timestamp information of the first packet based on the first period.

The timestamp information is used to indicate a time difference between a first time and a second time, the first time is a start sending time of the first packet in the first period, and the second time is a start time of the first period. For example, the network node may encapsulate the timestamp information into a tag field of an SRv6 frame header of a packet. The network node may send a plurality of packets in a same period, and the plurality of packets may be sent to different egress ports of a downstream node. Therefore, as the upstream node that sends a packet, the network node may calculate the time difference between the start sending time of the first packet and the start time of the first period when the first packet arrives at the egress port. For example, the network node obtains a total sending duration of all packets sent before the first packet in the first period, determines the first time based on the second time and the total sending duration, and determines the timestamp information based on the first time and the second time. The timestamp information may be the time difference between the first time and the second time.

It should be noted that, the first packet sent by the network node in the first period may be a $1^{st}$ packet sent in the period, or may alternatively be a non-$1^{st}$ packet, and the $1^{st}$ packet may be a packet sent at the start time of the first period. In this case, the network node may set the timestamp information of the first packet to 0, and the $1^{st}$ packet may alternatively be a packet sent after the first period starts for a period of time. In this case, the network node may set the timestamp information of the first packet to a value other than 0. Therefore, the network node may encapsulate the timestamp information for both the $1^{st}$ packet and the non-$1^{st}$ packet.

404. Encapsulate the timestamp information into the first packet to obtain a second packet.

The network node encapsulates the timestamp information into the first packet to obtain the second packet.

405. Send the second packet.

The network node sends the second packet to a downstream node.

It should be noted that, in this application, the network node may obtain the timestamp information of the first packet in real time based on packet sending progress when the first packet is to be sent, and encapsulate the timestamp information into the first packet to obtain the second packet. For example, when the first period starts, the network node sends the packet 1, and a sending duration of the packet 1 is a time units. Because the start sending time of the packet 1 and the start time of the first period are synchronous, the timestamp information encapsulated by the network node in the packet 1 is 0. After sending of the packet 1 is completed, the network node starts to send the packet 2, and a sending duration of the packet 2 is b time units. Because a time units of the first period have elapsed before the packet 2 is sent, the timestamp information encapsulated by the network node in the packet 2 is a. After sending of the packet 2 is completed, the network node starts to send a packet 3, and a sending duration of the packet 3 is c time units. Before the packet 3 is sent, a+b time units of the first period have elapsed. Therefore, the timestamp information encapsulated by the network node in the packet 3 is a+b. This rule applies to subsequent packets until the end of the first period. The time unit may be a unit used to measure any granularity of time. For example, one time unit is 1 ms or one timeslot. This is not specifically limited in this application.

In this embodiment, a packet sent by an upstream node to a downstream node carries timestamp information. The timestamp information is used to indicate a time difference between a start sending time of the packet in a sending period and a start time of the sending period at the upstream node, so as to notify the downstream node of an actual sending time of the packet, thereby implementing decoupling between a $1^{st}$ packet and a non-$1^{st}$ packet among packets, and helping the downstream node determine a sending period of the packets.

Figure 5:
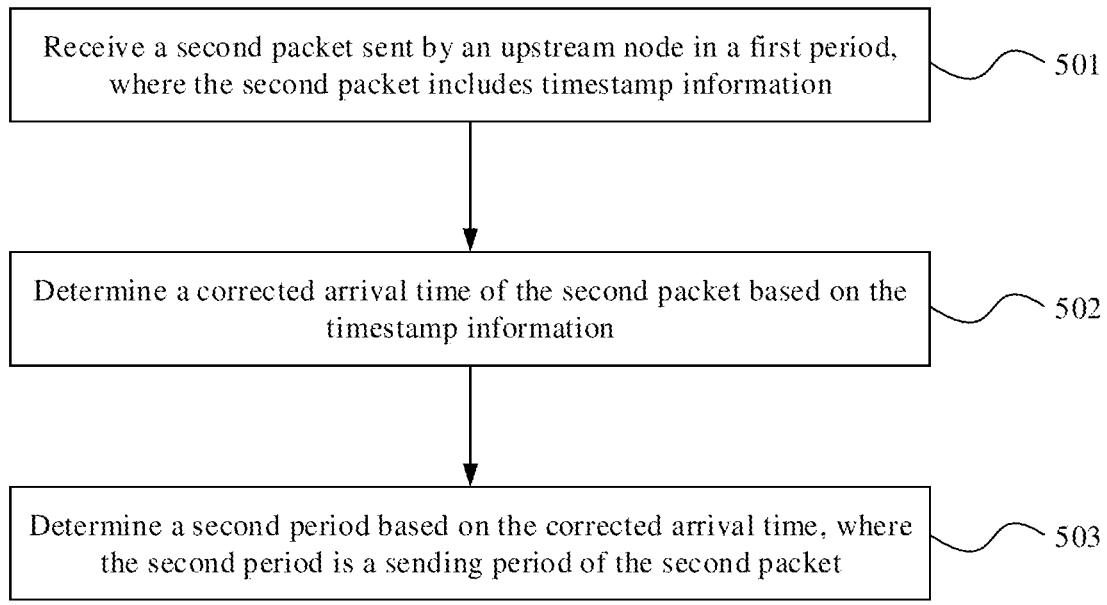
FIG. 5 is a flowchart of Embodiment 2 of a method for determining a sending period in a DIP according to an embodiment of this application.

FIG. 5 is a flowchart of Embodiment 2 of a method for determining a sending period in a DIP according to an embodiment this application. As shown in FIG. 5, the method in this embodiment may be performed by the network node 5 that is used as a downstream node in the application scenario shown in FIG. 3. The method for determining a sending period in a DIP includes the following steps.

501. Receive a second packet sent by an upstream node in a first period, where the second packet includes timestamp information.

The timestamp information is used to indicate a time difference between a first time and a second time, the first time is a start sending time of the second packet in the first period, and the second time is a start time of the first period. The network node receives the second packet from the upstream node. The second packet carries the timestamp information. An obtaining manner and a function of the timestamp information are described in the foregoing method embodiment, and details are not described herein again.

502. Determine a corrected arrival time of the second packet based on the timestamp information.

After receiving the second packet, the network node may record an actual arrival time of the second packet, where the timestamp information may be the time difference between the first time and the second time. Therefore, the network node calculates a difference between the actual arrival time of the first packet and the time difference, for example, t2=t1−Δt where t1 represents the actual arrival time of the first packet, Δt represents a time difference between the start sending time of the second packet in the first period and the start time of the first period, and t2 represents a corrected arrival time of the second packet. It can be learned that t2 indicates a difference between the actual arrival time of the second packet and an offset of the actual arrival time of the second packet on the upstream node relative to the start time of the first period. In other words, the actual arrival time of the packet in an assumed case in which the packet starts to be sent at the start time of the first period (a $1^{st}$ packet sent in the first period) is obtained indirectly.

503. Determine a second period based on the corrected arrival time, where the second period is a sending period of the second packet.

Based on the corrected arrival time of the second packet, for example, t2, the network node obtains the sending period of the second packet on the network node based on a period mapping relationship between the upstream node and a downstream node. In addition, the network node may alternatively obtain the sending period of the second packet by adding a processing latency and a jitter time to t2.

It should be noted that the method for determining the sending period of the second packet in this embodiment is also applicable to determining the sending period of the first packet in step 402 in the embodiment shown in FIG. 4.

In this embodiment, a downstream node obtains, through calculation based on timestamp information carried in a received packet, a corrected arrival time of the packet. The corrected arrival time is equivalent to a time when the packet sent at a start time of a sending period at the upstream node arrives at the downstream node. Based on the time, the network node can accurately obtain the sending period of the packet, thereby avoiding a problem of failure in periodic scheduling of a non-$1^{st}$ packet.

In a possible implementation, the second packet further includes a first period tag and the first period tag is used to indicate the first period. In this application, the network node compares the first period tag with a second period tag carried in a third packet, where the third packet is sent by the upstream node and received before the second packet; and if the first period tag is different from the second period tag, determines that the second packet is a $1^{st}$ packet sent by the upstream node in the first period; or if the first period tag is the same as the second period tag, determines that the second packet is a non-$1^{st}$ packet sent by the upstream node in the first period.

In the foregoing method, that is, how does the network node determine which packet is a $1^{st}$ packet sent in a sending period of the upstream node, and compare the period tag carried in the packet with the period tag carried in a previous packet received before the packet, if the two period tags are the same, it indicates that the two packets are sent in a same period, and therefore the latter packet is not the $1^{st}$ packet, or if the two period tags are different, it indicates that the two packets are not sent in a same period, and therefore the latter packet is the $1^{st}$ packet.

Several example embodiments are used as follows to describe in detail the technical solutions of the method embodiments shown in FIG. 4 and FIG. 5.

Figure 6:
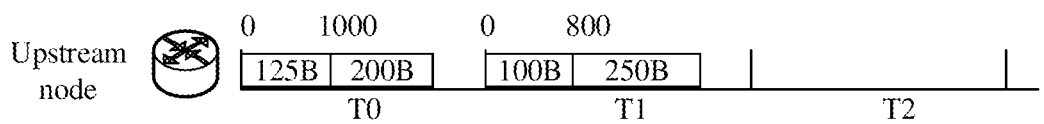
FIG. 6 is a schematic diagram of an application example of a method for determining a sending period in a DIP according to an embodiment of this application.
Figure 6:
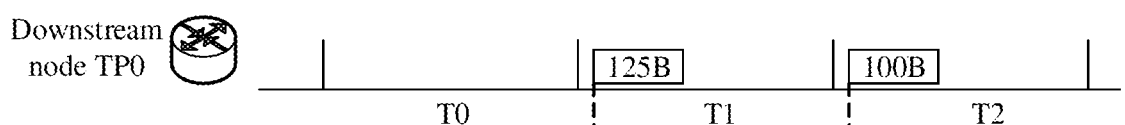
Figure 6:
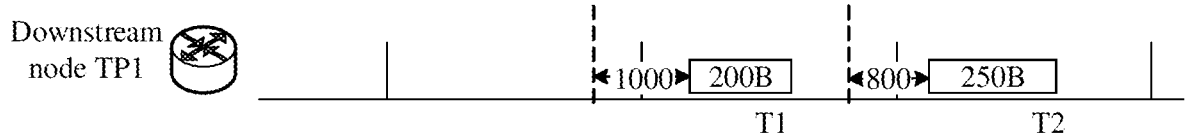

As shown in FIG. 6, the upstream node and the downstream node divide the time axes. Each time segment is one period, and the numbers of the periods are cyclically T0 to T2. The upstream node sends two packets in the period numbered T0. The packet sent first has 125 bytes (B) and is sent to an egress port TP0 of the downstream node. The packet sent later has 200 bytes and is sent to an egress port TP1 of the downstream node. The upstream node sends two packets in the period numbered T1. The packet sent first has 100 bytes and is sent to the egress port TP0 of the downstream node. The packet sent later has 250 bytes and is sent to the egress port TP1 of the downstream node. It is assumed that the upstream node and the downstream node are interconnected by using a GE link, and a transmission rate of the GE link is 1 Gbps.

When the upstream node sends a 125-B packet in the period numbered T0, because the packet starts to be sent at a start time of the period, timestamp information added by the upstream node to the packet is 0. A time needed for the upstream node to send the 125-B packet is 125 B×8/1 Gbps=1000 ns. Therefore, when the upstream node sends a 200-B packet, the timestamp information of the packet is set to 1000 (the time unit is ns).

When the upstream node sends a 100-B packet in the period numbered T1, because the packet starts to be sent at a start time of the period, timestamp information added by the upstream node to the packet is 0. A time needed for the upstream node to send a 100-B packet is 100 B×8/1 Gbps=800 ns. Therefore, when the upstream node sends the 250-B packet, the timestamp information of the packet is set to 800 (the time unit is ns).

After receiving the 125-B packet, the downstream node obtains a corrected arrival time of the packet based on the timestamp information ($\Delta t=0$) of the packet, that is, an actual arrival time $t2=t1-\Delta t=t1$. Based on the corrected arrival time t2, a sending period tag of the 125-B packet at the downstream node is calculated to be a number of the first period after the period in which $t3=t2+T+t_{jitter}$ is located, where T represents a complete period. Because T is added only when an arrival position (time) of a tail bit of the 125-B packet is determined, $t_{jitter}$ represents a jitter time. After receiving the 200-B packet, the downstream node obtains the corrected arrival time $t2=t1-\Delta t=t1-1000$ of the packet based on the timestamp information ($\Delta t=1000$) of the packet. Based on the corrected arrival time t2, a sending period tag of the 200-B packet at the downstream node is calculated to be a number of the first period after the period in which $t3=t2+T+t_{jitter}$ located, where T represents a complete period. Because T is added only when an arrival position (time) of a tail bit of the 200-B packet is determined, $t_{jitter}$ represents a jitter time. It can be learned that t2 of the 200-B packet and t2 of the 125-B packet obtained through calculation are equal.

After receiving the 100-B packet, the downstream node obtains a corrected arrival time of the packet based on the timestamp information ($\Delta t=0$) of the packet, that is, an actual arrival time $t2=t1-\Delta t=t1$. Based on the corrected arrival time t2, a sending period tag of the 100-B packet at the downstream node is calculated to be a number of the first period after the period in which $t3=t2+T+t_{jitter}$ is located, where T represents a complete period. Because T is added only when an arrival position (time) of a tail bit of the 100-B packet is determined, $t_{jitter}$ represents a jitter time. After receiving the 250-B packet, the downstream node obtains the corrected arrival time $t2=t1-\Delta t=t1-800$ of the packet based on the timestamp information ($\Delta t=800$) of the packet. Based on the corrected arrival time t2, a sending period tag of the 250-B packet at the downstream node is calculated to be a number of the first period after the period in which $t3=t2+T+t_{jitter}$ is located, where T represents a complete period. Because T is added only when an arrival position (time) of a tail bit of the 250-B packet is determined, $t_{jitter}$ represents a jitter time. It can be learned that t2 of the 250-B packet and t2 of the 100-B packet obtained through calculation are equal.

Figure 7:
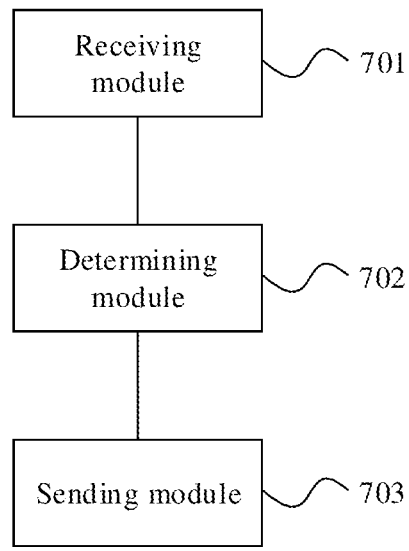
FIG. 7 is a schematic diagram of a structure of an embodiment of a network apparatus according to an embodiment of this application.

FIG. 7 is a schematic diagram of an example structure of an apparatus embodiment of this application. As shown in FIG. 7, an apparatus in this embodiment may be applied to the network node 4 (the upstream node) or the network node 5 (the downstream node) in FIG. 3. The apparatus includes a receiving module 701, a determining module 702, and a sending module 703.

When the apparatus is applied to the upstream node, the receiving module 701 is configured to receive a first packet; the determining module 702 is configured to determine a first period, where the first period is a sending period of the first packet, determine timestamp information of the first packet based on the first period, where the timestamp information is used to indicate a time difference between a first time and a second time, the first time is a start sending time of the first packet in the first period, and the second time is a start time of the first period, and encapsulate the timestamp information into the first packet to obtain a second packet; and the sending module 703 is configured to send the second packet.

In a possible implementation, the determining module 702 is specifically configured to obtain a total sending duration of all packets sent before the first packet in the first period; determine the first time based on the second time and the total sending duration; and determine the timestamp information based on the first time and the second time.

In a possible implementation, the timestamp information includes the time difference between the first time and the second time.

When the apparatus is applied to the downstream node, the receiving module 701 is configured to receive a second packet sent by an upstream node in a first period, where the second packet includes timestamp information, the timestamp information is used to indicate a time difference between a first time and a second time, the first time is a start sending time of the second packet in the first period, and the second time is a start time of the first period; and the determining module 702 is configured to determine a corrected arrival time of the second packet based on the timestamp information, and determine a second period based on the corrected arrival time, where the second period is a sending period of the second packet.

In a possible implementation, the timestamp information includes the time difference between the first time and the second time.

In a possible implementation, the determining module 702 is specifically configured to calculate a difference between an actual arrival time of the first packet and the time difference, and use the difference as the corrected arrival time.

In a possible implementation, the second packet further includes a first period tag and the first period tag is used to indicate the first period; the determining module 702 is further configured to: compare the first period tag with a second period tag carried in a third packet, where the third packet is sent by the upstream node and received before the second packet; and if the first period tag is different from the second period tag, determine that the second packet is a $1^{st}$ packet sent by the upstream node in the first period; or if the first period tag is the same as the second period tag, determine that the second packet is a non-$1^{st}$ packet sent by the upstream node in the first period.

The apparatus in this embodiment may be configured to perform the technical solutions in the method embodiment shown in FIG. 4 or FIG. 5, and implementation principles and technical effects of the apparatus are similar and are not described herein again.

Figure 8:
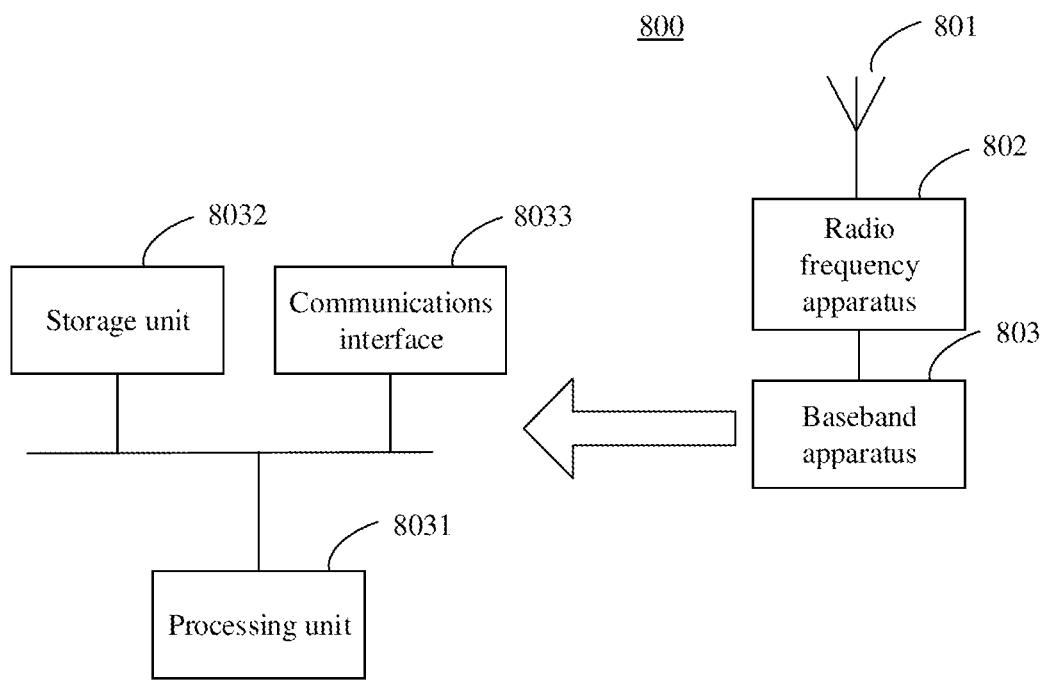
FIG. 8 is a schematic diagram of a structure of a network node according to an embodiment of this application.

FIG. 8 is a schematic diagram of a structure of a network node according to an embodiment of this application. As shown in FIG. 8, the network node 800 includes an antenna 801, a radio frequency apparatus 802, and a baseband apparatus 803. The antenna 801 is connected to the radio frequency apparatus 802. The radio frequency apparatus 802 receives a signal by using the antenna 801 and sends the received signal to the baseband apparatus 803 for processing. The baseband apparatus 803 generates a signal that needs to be sent, and sends the generated signal to the radio frequency apparatus 802. The radio frequency apparatus 802 transmits the signal by using the antenna 801.

The baseband apparatus 803 may include one or more processing units 8031. The processing unit 8031 may be a processor in an embodiment.

In addition, the baseband apparatus 803 may further include one or more storage units 8032 and one or more communications interfaces 8033. The storage unit 8032 is configured to store a computer program and/or data. The communications interface 8033 is configured to exchange information with the radio frequency apparatus 802. The storage unit 8032 may be specifically a memory and the communications interface 8033 may be an input/output interface or a transceiver circuit.

Optionally, the storage unit 8032 may be a storage unit located on a same chip as the processing unit 8031, namely, an on-chip storage unit, or may be a storage unit located on a different chip from the processing unit 8031, namely, an off-chip storage unit. This is not limited in embodiments of this application.

In FIG. 8, the baseband apparatus 803 may perform the operations and/or processing performed by the determining module 702 in the apparatus embodiment (for example, FIG. 7). The radio frequency apparatus 802 may perform the operations and/or processing performed by the receiving module 701 and the sending module 703 in the apparatus embodiment (for example, FIG. 7).

In an implementation process, the steps in the foregoing method embodiments may be completed by using a hardware integrated logic circuit in the processor or instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in the embodiments of this application may be directly executed and completed by using a hardware encoding processor, or may be executed and completed by using a combination of hardware and software modules in the encoding processor. A software module may be located in a mature storage medium in the art, such as a random access memory, a flash memory, a read-only memory, a programmable read-only memory, an electrically erasable programmable read-only memory, or a register. The storage medium is located in the memory, and the processor reads information in the memory and completes the steps of the foregoing method in combination with hardware of the processor.

The memory in the foregoing embodiments may be a volatile memory or a nonvolatile memory, or may include both a volatile memory and a nonvolatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that, the memory in the system and method described in this specification includes but is not limited to these memories and any memory of another proper type.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the described system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely non-limiting examples of implementations of this application, and are not intended to limit the protection scope, which is intended to cover any variation or replacement readily determined by a person of ordinary skill in the art. Therefore, the claims shall define the protection scope of this application.

What is claimed is:

1. A method for determining a sending period of a packet in a deterministic network, comprising:
   receiving a first packet;
   determining a first period of the first packet, wherein the first period is a sending period of the first packet;
   determining timestamp information of the first packet based on the first period, wherein the timestamp information indicates a time difference between a first time and a second time, the first time is a start sending time at which the first packet starts to be sent in the first period, and the second time is a start time of the first period;
   encapsulating the timestamp information into the first packet to generate a second packet; and
   sending the second packet.

2. The method according to claim 1, wherein the determining timestamp information of the first packet based on the first period comprises:
   obtaining a total sending duration of all packets sent before the first packet in the first period;
   determining the first time based on the second time and the total sending duration; and
   determining the timestamp information based on the first time and the second time.

3. The method according to claim 1, wherein the timestamp information comprises the time difference between the first time and the second time.

4. A method for obtaining a period mapping relationship in a deterministic network, comprising:
   receiving a second packet sent by an upstream node in a first period, wherein the second packet comprises timestamp information, the timestamp information indicates a time difference between a first time and a second time, the first time is a time at which the second packet starts to be sent in the first period, and the second time is a start time of the first period;
   determining a corrected arrival time of the second packet based on the timestamp information; and
   determining a second period of the second packet based on the corrected arrival time, wherein the second period is a sending period of the second packet.

5. The method according to claim 4, wherein the timestamp information comprises the time difference between the first time and the second time.

6. The method according to claim 5, wherein the determining a corrected arrival time of the second packet based on the timestamp information comprises:
   calculating a difference between an actual arrival time of the second packet and the time difference as the corrected arrival time.

7. The method according to claim 4, wherein the second packet further comprises a first period tag indicating the first period; and the method further comprises:
   comparing the first period tag with a second period tag carried in a third packet, wherein the third packet is sent by the upstream node and received before the second packet;
   when the first period tag is different from the second period tag, determining that the second packet is a $1^{st}$ packet sent by the upstream node in the first period; and
   when the first period tag is the same as the second period tag, determining that the second packet is a non-$1^{st}$ packet sent by the upstream node in the first period.

8. An apparatus, comprising:
   one or more processors; and
   a non-transitory computer-readable memory storing a program including instructions that, when executed by the one or more processors, cause the apparatus to:
   receive a first packet;
   determine a first period of the first packet, wherein the first period is a sending period of the first packet, and determine timestamp information of the first packet based on the first period, wherein the timestamp information indicates a time difference between a first time and a second time, the first time is a time at which the first packet starts to be sent in the first period, and the second time is a start time of the first period;
   encapsulate the timestamp information into the first packet to generate a second packet; and
   send the second packet.

9. The apparatus according to claim 8, wherein the program further comprises instructions that cause the apparatus to:
   obtain a total sending duration of all packets sent before the first packet in the first period; determine the first time based on the second time and the total sending duration; and determine the timestamp information based on the first time and the second time.

10. The apparatus according to claim 8, wherein the timestamp information comprises the time difference between the first time and the second time.

11. An apparatus, comprising:
    one or more processors; and
    a non-transitory computer-readable memory storing a program to be executed by the one or more processors, the program including instructions that, when executed by the one or more processors, cause the apparatus to:
    receive a second packet sent by an upstream node in a first period, wherein the second packet comprises timestamp information, the timestamp information indicates a time difference between a first time and a second time, the first time is a time at which the second packet starts to be sent in the first period, and the second time is a start time of the first period;
    determine a corrected arrival time of the second packet based on the timestamp information; and
    determine a second period based on the corrected arrival time, wherein the second period is a sending period of the second packet.

12. The apparatus according to claim 11, wherein the timestamp information comprises the time difference between the first time and the second time.

13. The apparatus according to claim 12, wherein the program further comprises instructions that, when executed by the one or more processors, cause the apparatus to:
    calculate a difference between an actual arrival time of the second packet and the time difference as the corrected arrival time.

14. The apparatus according to claim 11, wherein the second packet further comprises a first period tag and the first period tag indicates the first period and the program further comprises instructions that, when executed by the one or more processors, cause the apparatus to:
    compare the first period tag with a second period tag carried in a third packet, wherein the third packet is sent by the upstream node and received before the second packet;

when the first period tag is different from the second period tag, determine that the second packet is a $1^{st}$ packet sent by the upstream node in the first period; and when the first period tag is the same as the second period tag, determine that the second packet is a non-$1^{st}$ packet sent by the upstream node in the first period.

* * * * *

UNITED STATES PATENT AND TRADEMARK OFFICE
CERTIFICATE OF CORRECTION

| | |
|---|---|
| PATENT NO. | : 11,677,670 B2 |
| APPLICATION NO. | : 17/680535 |
| DATED | : June 13, 2023 |
| INVENTOR(S) | : Yang Liu |

It is certified that error appears in the above-identified patent and that said Letters Patent is hereby corrected as shown below:

In the Specification

Column 9, Lines 28 and 29 change "$t3=t2+T+t_{jitter}$ located" to --$t3=t2+T+t_{jitter}$ is located--.

Signed and Sealed this
Eleventh Day of July, 2023

Katherine Kelly Vidal
*Director of the United States Patent and Trademark Office*